UNITED STATES PATENT OFFICE.

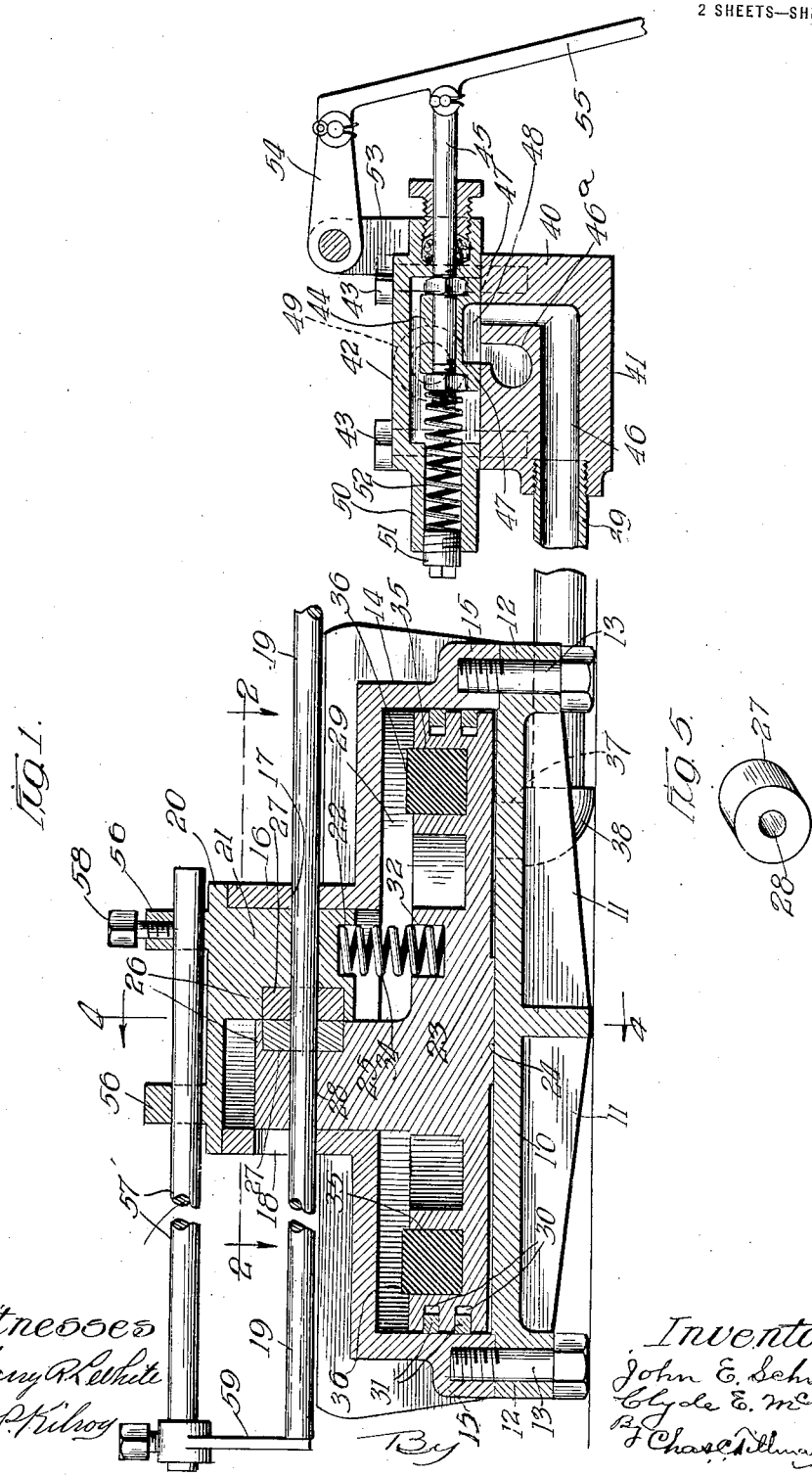

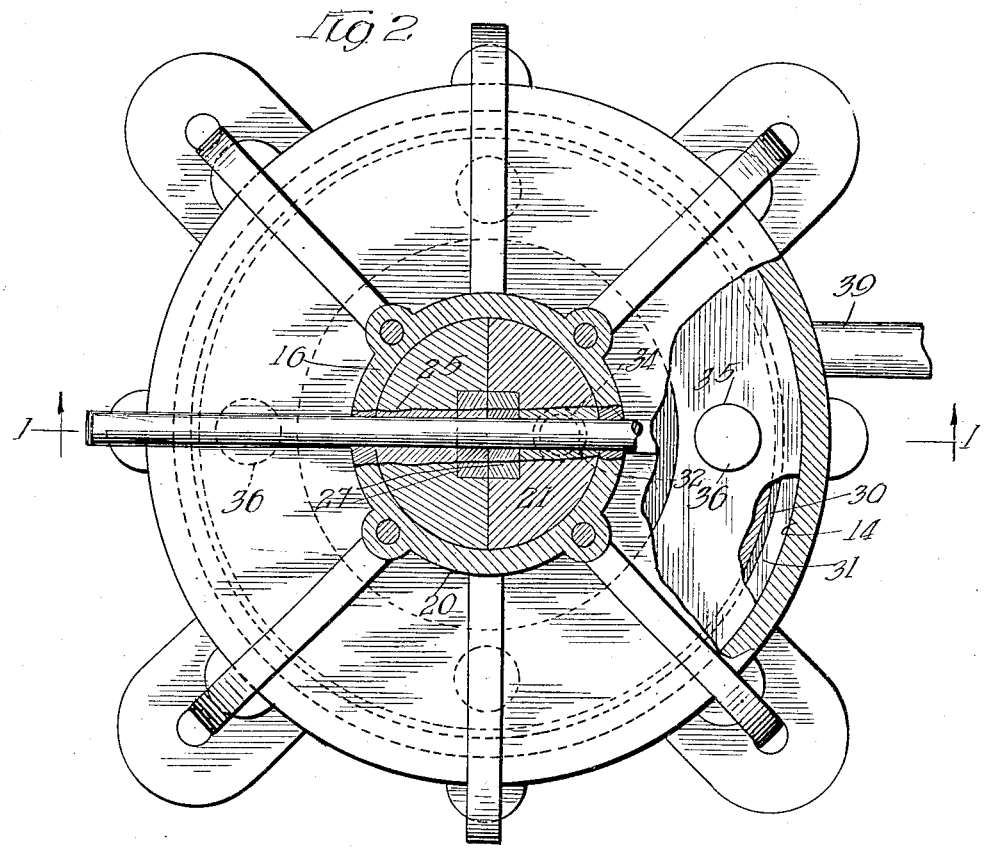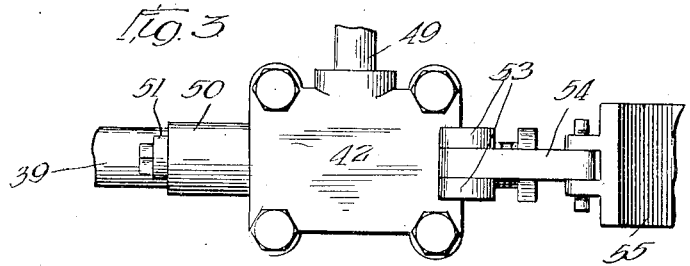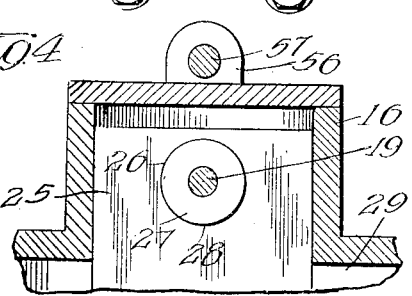

JOHN E. SCHMIDT AND CLYDE E. McARTHUR, OF CHICAGO, ILLINOIS.

ROD-CUTTER.

1,336,589.  Specification of Letters Patent.  Patented Apr. 13, 1920.

Application filed January 9, 1920. Serial No. 350,345.

*To all whom it may concern:*

Be it known that we, JOHN E. SCHMIDT and CLYDE E. MCARTHUR, residing at Chicago, in the county of Cook and State of Illinois, have invented certain new and useful Improvements in Rod-Cutters, of which the following is a specification.

The invention relates to improvements in a device to be used for cutting rods and the like in desired lengths, and it consists in certain peculiarities of the construction, novel arrangement and operation of the parts thereof, as will be hereinafter more fully set forth and specifically claimed.

The object of our invention is to provide a rod cutter wherein fluid pressure is employed for operating the parts thereof, which shall be simple and inexpensive in construction, strong, durable and efficient in operation, and compact in form.

Another object of the invention is to so construct the parts of the device that the positions of the cutting dies in their seats may be changed, to the end, that each die will afford a plurality of cutting edges or portions presented to the rods after one or more of said cutting portions have become dulled or impaired.

Other objects and advantages of the invention will be disclosed in the subjoined description and explanation.

In the accompanying drawings, which serve to illustrate an embodiment of the invention—

Figure 1 is a central vertical sectional view taken on line 1—1 of Fig. 2 looking in the direction indicated by the arrows and showing a valve for controlling the fluid used for operating the cutter, said view being shortened for the convenience of illustration.

Fig. 2 is a plan sectional view taken on line 2—2 of Fig. 1 as indicated by the arrows, but with the controlling valve omitted.

Fig. 3 is a plan view of the valve.

Fig. 4 is a fragmental sectional view of a portion of the cylinder or casing of the device showing one of the dies thereof mounted on the reciprocating piston taken on line 4—4 of Fig. 1 looking in the direction indicated by the arrows, and Fig. 5 is a detached perspective view of one of the cutting dies.

Like numerals of reference refer to corresponding parts throughout the different views of the drawings.

The reference numeral 10 designates the base plate of the device, which plate may be of the ordinary or any suitable construction, but as shown is provided with radially extended strengthening ribs 11 on its lower surface and with suitable spaced apart openings 12 near its periphery for the reception of screw bolts 13 used for securing in position on the upper surface of the base plate a cylinder or casing 14 which by preference is cylindrical in shape and of an inverted cup form as is clearly shown in Fig. 1 of the drawings. The cylinder or casing 14 is provided on its periphery with spaced apart bosses or enlargements 15 each of which is provided with a screw threaded opening to receive the screw threaded upper portions of the bolts 13. The central upper portion of the cylinder or casing 14 is provided with an annular and vertical extension 16 having in its walls an opening 17 and diametrically opposite said opening a vertically elongated slot or opening 18 which opening and slot are for the reception of the stock or rods 19 to be cut into pieces of the desired lengths by the machine.

The top of the extension 16 is closed by a cover 20 suitably bolted to the extension 16 and said cover has extended downwardly therefrom a segmental or semi-circular projection 21, the circular portion of which fits snugly against the inner wall of the extension 16 of the casing.

As shown in Fig. 1, this projection extends downwardly to near the lower surface of the top of the enlarged part of the casing and has formed in its lower end a socket 22. Located for vertical movement in the enlarged cavity of the casing 14 is a plunger or piston 23 which is of a shape to correspond with the shape of the cavity of the casing and by preference has on its lower surface a centrally located boss or extension 24 employed to normally rest on the upper surface of the base plate in order to provide space between said surface of the base 10 and the adjacent surface of the piston for the ready reception of compressed air or other suitable fluid under pressure. The piston or plunger is provided on its upper surface near its middle portion with a vertical projection 25 which is segmental or semi-circular in cross-section and occupies a position in the space between the flat surface of the projection 21 and the wall of the casing 16 in which the opening or slot 18 is located.

The adjacent faces of the projections 21 and 25 are each provided with a circular recess or seat 26 for the cutting dies 27 which as is clearly shown in Fig. 5 are cylindrical in shape and each has extended centrally therethrough an opening 28 for the reception of the stock or rods 19 while being cut. The projection 25 of the piston extends upwardly within the hollow extension 16 of the casing to a point located on a line extended horizontally through the upper end of the opening or slot 18 when the piston is in its normal position.

By reference to Fig. 1 it will be seen and understood that the upper surface of the main or body portion of the piston 23 is normally located at about the same distance from the top of the cavity 29 in the enlarged portion of the casing as the upper surface of the projection 25 is located from the lower surface of the cover 20 of the hollow extension 16, thus permitting movement of the piston 23 and its projection 25 for the same distance.

It will be understood that the openings in the cutting dies 27 are located in register with the openings 28 in the projections 21 and 25 and also that said openings will register with the opening 17 in the wall of the extension 16 when the parts are in their normal positions, so that a rod can be readily inserted through and out through the slot or opening 18 to any desired extent. The periphery of the piston 23 is provided with one or more grooves 30 for the reception of packing rings 31 of the ordinary or any preferred construction employed to produce a close working fit between the piston and the vertical wall of the casing.

Located directly beneath the socket or recess 22 in the projection 21 is a socket or recess 32 formed in the upper surface of the piston for the reception of one end of a coil spring 34 the other end of which is located in the recess 22 of the projection 21 which is stationary. This spring is employed to cause the reaction of the piston 23 after it has been raised or advanced by means of compressed air or other fluid under pressure. The piston 23 is provided in its upper surface with a plurality of spaced apart openings 35 in each of which is located a resilient buffer 36 of rubber or other suitable material used for contacting with the upper wall of the cavity 29 to prevent undue noise.

Communicating through a suitable opening 37 in the base 10 and a coupling 38 is a fluid supply pipe 39 which has mounted thereon a valve casing 40 which may be located at any suitable point near the machine. This valve casing comprises a body portion 41 and a chamber or casing 42 mounted thereon and secured thereto by means of screw bolts 43 which casing is for the reception and operation of a sliding valve 44 which is mounted on a stem 45 extended through a suitable opening in one end of the said chamber or casing. The inner or upper surface of the body 41 is provided with a port 46 which leads from the chamber 42 and communicates with the pipe 39.

The valve 44 has at each of its ends a head 47 which heads rest on the inner surface of the body 41 and as shown in Fig. 1 are separated by a port 48 which is adapted for communication with a pipe 49 leading from the chamber or casing 42 to a supply of fluid under pressure, not shown.

As will be seen by reference to Figs. 1 and 3 of the drawings, the casing 42 is provided with a hollow and internally screw-threaded projection 50, in which is adjustably located a screw plug 51 for adjusting the tension of a spring 52 one end of which rests against said plug and the other against the adjacent end of the valve 44. The opposite end of the casing 42 is provided with a pair of spaced apart projections 53 between which is pivotally secured a link 54 to the outer end of which is pivotally secured one end of an operating lever 55 which is pivotally connected between its ends to the outer end of the valve stem or rod 45.

Adjustably located in a pair of transversely apertured projections 56 on the upper surface of the cover 20 of the extension 16 of the casing or cylinder is a gage rod 57 which may be fixed at any desired point by means of a set screw 58 located in one of said projections. This rod has adjustably mounted on one of its ends an arm 59 which is adapted to be placed in the path of the rod or stock 19 as shown in Fig. 1 so as to regulate the length of the pieces into which said rod is cut by the machine.

Having thus fully described our invention, what we claim as new and desire to secure by Letters Patent, is—

1. In a machine of the class described, the combination with a casing having near one of its ends a pair of alined openings, of a projection extended into said casing and having a die seat or recess in one of its faces and provided with an opening alined with one of the openings in the casing, a piston movably mounted in the casing and having a projection extended alongside of the first named projection, the projection on said piston having in its sides adjacent to the other projection a die seat or recess and provided with an opening alined with the opening in the casing adjacent thereto, an apertured die located in each of said seats therefor, and means to reciprocate the piston.

2. In a machine of the class described, the combination with a casing having at one of its ends a die carrying projection extended therein provided with a die and provided with oppositely disposed openings in its wall, said die and projection having an opening in register with one of said openings in the casing, of a piston movably located in the casing and having a die carrying projection extended alongside the first named projection, the projection and die on the piston having an opening to register with the other opening of the casing and means to reciprocate the piston.

3. In a machine of the class described, the combination with a casing having at one of its ends a reduced cylindrical extension provided with diametrically disposed openings in its wall, of a cross-sectionally segmental projection extended into said extension and fixed therein, said projection having in its flat face a die seat and an opening leading from said seat in register with one of the openings in said extension, a piston movably located in the casing and having a cross-sectionally segmental projection located between the first named projection and the wall of said extension and having in its flat surface a die seat to register with the die seat in the first named extension, the projection on the piston having an opening in register with the other opening in said extension, an apertured die located in each of said die seats and means to reciprocate the piston.

4. In a machine of the class described, the combination with a casing having at one of its ends a die carrying projection extended therein and fixed thereto and provided with a die and provided with oppositely disposed openings in its wall, said die and projection having an opening in register with one of said openings in the casing, a piston movably located in the casing and having a die carrying projection extended alongside the first named projection, the projection and die on the piston having an opening to register with the other opening of the casing, resilient buffers carried by the piston, and means to reciprocate the latter.

5. In a machine of the class described, the combination with a casing having at one of its ends a reduced cylindrical extension provided with diametrically disposed openings in its wall, of a cross-sectionally segmental projection extended into said extension and fixed therein, said projection having in its flat face a die seat and an opening leading from said seat in register with one of the openings in said extension, a piston movably located in the casing and having a cross-sectionally segmental projection located between the first named projection and the wall of said extension and having in its flat surface a die seat to register with the die seat in the first named extension, the projection on the piston having an opening in register with the other opening in said extension, an apertured die detachably located in each of said die seats, a spring interposed between the inner end of the first named projection and the piston, and means to reciprocate the latter.

6. In a machine of the class described, the combination with a casing having at one of its ends a reduced cylindrical extension provided with diametrically disposed openings in its wall, of a cross-sectionally segmental projection extended into said extension and fixed therein, said projection having in its flat face a die seat and an opening leading from said seat in register with one of the openings in said extension, a piston movably located in the casing and having a cross-sectionally segmental projection located between the first named projection and the wall of said extension and having in its flat surface a die seat to register with the die seat in the first named extension, the projection on the piston having an opening in register with the other opening in said extension, an apertured die detachably located in each of said die seats, a spring interposed between the inner end of the first named projection and the piston, resilient buffers located on the inner surface of the piston, and means to reciprocate the latter.

In testimony whereof we have hereunto set our hands, on this, the 5th day of January, 1920.

JOHN E. SCHMIDT.
CLYDE E. McARTHUR.